UNITED STATES PATENT OFFICE.

WILLIAM MUNRO SANDISON, OF ASHFIELD, AYTON, SCOTLAND, ASSIGNOR OF ONE-HALF TO HERBERT G. McKERROW, OF NEWTON, MASSACHUSETTS.

PROCESS FOR PREVENTING AND LAYING OF DUST THROUGH THE APPLICATION TO ROADS OR ROAD MATERIAL OF AN AQUEOUS EMULSION OF OIL.

13,024. Specification of Reissued Letters Patent. Reissued Sept. 28, 1909.

No Drawing. Original No. 813,389, dated February 20, 1906, Serial No. 247,833. Application for reissue filed February 18, 1908. Serial No. 417,209.

*To all whom it may concern:*

Be it known that I, WILLIAM MUNRO SANDISON, a subject of the King of the United Kingdom of Great Britain and Ireland, residing at Ashfield, Ayton, in the county of Berwick, Scotland, have invented a certain new and useful Process for Preventing and Laying of Dust Through the Application to Roads or Road Material of an Aqueous Emulson of Oil, of which the following is a specification.

My invention relates to roads, and more particularly to the manner of dressing the surface thereof to avoid the raising of dust.

The main object of the invention is to provide a surface dressing for roads, streets, mine cuts, and galleries, railway ballasts, factory floors, and other similar relations which will lay the dust, with a minimum of liability to dispersion by atmospheric action, or other influences.

A further object is to provide such a dressing embodying therein a non-volatile oily substance the proportions or quantity of which may be regulated to adapt it to the nature of the surface, or the quantity or quality of the dust liable to be produced, or present thereon.

A still further object is to provide such a dressing in which the agent by means of which the non-volatile oil may be emulsified may be procured at small cost, while possessing salts which will impart to the dressing characteristics resulting in hygroscopic action when applied to a road.

A still further object is to provide a dressing of this character which will hold in suspension mineral matter which will tend to fill voids in the road surface.

A still further object is to provide in a road dressing, an animal fat in the presence of an alkali, a combination which will not only be capable of being itself emulsified but which has such an affinity for other non-volatile oils, as to combine therewith, and make the entire mass capable of being emulsified, or placed in solution with water.

A still further object is to provide a road dressing wherein the oily constitutents may be condensed to facilitate their transportation and be diluted as required for use.

A still further object is to provide a road dressing, wherein oily substances possessing disinfecting properties may be included in the aqueous solution if desired.

A still further object is to provide a road dressing which may be inexpensively produced, and applied, and which will effectively lay dust for a considerable length of time.

The invention consists primarily in a process for dressing roads consisting of the application to a road surface of an aqueous emulsion embodying therein animal fats, greases, or waxes combined with an alkali or alkaline salt, and in such other novel treatments of road surfaces, or the material entering into the construction of same, as are hereinafter set forth, and described, and more particularly pointed out in the claims hereto appended.

In carrying out my invention I provide a surface dressing for roads consisting of an animal fat, grease or wax combined with an alkali, preferably carbonate of potash in such proportions as to impart thereto a high degree of the property of emulsification with water, thus permitting the formation of an aqueous solution of a consistency to permit the economic dressing of road surfaces. This solution also has an affinity for oily matter that may be mingled with it, thus permitting the addition to said solution of an appropriate quantity of any suitable oil or grease or oil like substance which tends to render the hygroscopic salts still more deliquescent. The use of an animal fat, grease or wax combined with an alkali permits the use of both mineral and vegetable oils non-volatile in their nature in the solution, and if desired, such oils may be selected with a view to their disinfecting properties, as for example, creosote. This solution above referred to, is applied to the road or other surface by means of any suitable sprinkling or distributing apparatus, in a manner to wet down the entire road surface. This solution is readily absorbed by dust, dry soil, or any other fine surface to a road, the oily part of the solution adhering tenaciously to the fine particles of the road surfacing material. The hygroscopic action of the salts in the solution, abstracts and retains sufficient moisture from the atmosphere to increase the efficiency of the solution as to its dust preventive and laying powers, to an extent that even a slight dew will cause treated surfaces to appear moist for hours after untreated surfaces have become dry. To cause the fluid surface dressing to preserve the road surface and incidentally to increase the efficiency of the solution, a quantity of fine sand or other mineral may be placed in the solution, which sand or other filler will be coated with the oily part of the solution and discharged upon the road or other surfaces in a manner to partly fill voids in said surface, and at the same time act more or less as a bond to give a good continuous dressed surface.

The character of the animal fats, oils or waxes, forming the base of the oily solution, will vary with local conditions, as will the oil placed in solution with the first named fats, oils or waxes and the alkali combined therewith. To insure economy, I may employ the by-product known as "wool fat" or "wool wax," which in the presence of an alkali possesses in a high degree the property of emulsification with water, and has an affinity for other oily matter which permits it to be placed in solution therewith. Unwashed wool contains this by-product together with potash salts and fine sand charged with oleaginous matter which by well known processes are liberated in the form of suds. Obviously from their bulk, the economical use of such suds is practical only in the immediate vicinity of wool washing establishments, so that at more remote points some equivalent compound must be employed. If it be desired, the suds may be condensed and if desired, mixed with suitable oils, to such a degree of consistency that the semi-liquid mass can afterward be further diluted with water to the desired extent, and if desired, oils to the desired extent may be added, and emulsified with the condensed base at the point of use.

When I use "wool fat" or "wool wax," any concentrated or other suds from which the more valuable portion of the fat or wax has been removed leaving a solution containing the lower grades of these substances and the remaining substances in substantially the original quantities and grades, may also be used. When deliquescent salts are not present in the desired quantities, such may be added.

The character and origin of the animal oil, fat or wax is immaterial, and I can make use of commercial "wool fat" or "wool wax" for instance such as is produced by the French battage system and by the acid cracking, evaporation followed by settling and skimming, evaporation followed by centrifugal treatment, and the naphtha or other solvent processes, all well known processes in the arts, and I may also utilize such impure combinations of "wool fat" or "wool wax," as may result from those recovery processes which treat wool washing suds in combination with other trade and domestic effluents.

If desired, the solution heretofore described may be mixed with a suitable mineral of an absorbent and grease or oil-retaining nature, as fullers' earth, to give additional body to the dressing. While under most conditions, the solution will be distributed over the surfaces of roads as heretofore described, it may be used to treat the material of which roads are built, or a sand dressing to be applied to hard surfaced roads as wood block, asphalt or stone roads. The amount of the emulsion or solution used or the quantity of water or oil in the solution may be varied to meet the requirements of local conditions.

I believe it to be broadly new to treat road surfaces with an aqueous emulsion embodying therein animal fats, oils or waxes, combined with an alkali or alkaline salt; and also that such an emulsion is the only way it is possible to place in solution a mineral oil for the purpose of applying it economically to road surfaces and I intend to claim such broadly.

Having described the invention, what I claim as new and desire to have protected by Letters Patent is:—

1. The herein described process for dressing roads consisting of the application to the surface of a road or the surface material of a road of an aqueous emulsion embodying therein animal fats, greases or waxes combined with an alkali or alkaline salt.

2. The herein described process for dressing roads consisting of the application to the surface of a road or the surface material of a road of an aqueous emulsion embodying therein animal fats, greases or waxes combined with an alkali or alkaline salt, and a non-volatile oil-like substance.

3. The herein described process for dressing roads, consisting of the application to the surface of a road or the surface material of a road, of an aqueous emulsion embodying therein animal fats, greases or waxes, combined with an alkali or alkaline salt, and a non-volatile oil like substance having disinfectant properties.

4. The herein described process for dressing roads consisting of the application to the surface of a road or the surface material of a road, of an aqueous emulsion embodying therein animal fats, greases or waxes combined with a deliquescent alkali, or alkaline salt, and a non-volatile oil like substance.

5. The herein described process for dressing roads consisting of the application to the surface of a road or to the surface material of a road, of an aqueous emulsion obtained by diluting the concentrated greases, fats or waxes recovered from trade or domestic effluents or wastes and an alkali or alkaline salt.

6. The her in described process for dressing roads consisting of the application to the surface of a road or the surface material of a road, of an aqueous emulsion embodying therein "wool fat" or "wool wax" combined with an alkali or alkaline salt.

7. The herein described process for dressing roads consisting of the application to the surface of a road or road surface material of an aqueous emulsion embodying therein "wool fat" or "wool wax" combined with an alkali or alkaline salt, and a non-volatile oil like substance.

8. The herein described process for dressing roads consisting of the application to the surface of a road or to the surface material of a road of an aqueous emulsion embodying therein wool scouring suds and a non-volatile oil.

9. The herein described process for dressing roads consisting of the application to the surface of a road or the surface material of a road, of an aqueous emulsion obtained by combining concentrated wool scouring suds, a deliquescent salt, and a non-volatile oil, and diluting same.

10. The herein described process for dressing roads consisting of the application to the surface of a road, of an aqueous emulsion embodying therein an animal fat, oil or wax combined with an alkali, or an alkaline salt, a non-volatile oil, and a fine mineral substance of a grease retaining nature.

11. The herein described process for dressing roads, consisting of concentrating wool scouring suds and subsequently incorporating therewith a non-volatile oil-like substance, preferably creosote, to produce a mass of semi-liquid consistency capable of dilution by water, and applying same to the road surface substantially as specified.

12. The herein described process for dressing roads consisting of concentrating wool scouring suds, adding to such concentrated suds as are lacking or poor in natural potash, salts of a deliquescent salt, and by combining therewith a non-volatile oil-like substance, preferably creosote, to produce a mass of semi-liquid consistency dilutable by water and applying same to the road surface, substantially as specified.

13. The herein described process for dressing roads, consisting of adding to wool fat a suitable alkali or alkaline salt, preferably of a deliquescent nature and by combining therewith a non-volatile oil-like substance, preferably creosote, to produce a mass of semi-liquid consistency dilutable by water and applying same to the road surface, substantially as specified.

In witness whereof I have hereunto affixed my signature this twenty seventh day of September 1907, in the presence of two witnesses.

WILLIAM MUNRO SANDISON.

Witnesses:
ALEXANDER FARMER,
JAMES THOMSON.